Sept. 25, 1928.  1,685,738
G. M. ALBRECHT
DYNAMO ELECTRIC MACHINE AND WINDING THEREFOR
Filed July 6, 1926  3 Sheets-Sheet 1

Sept. 25, 1928.　　　　　　　　　　　　　　　　　1,685,738
G. M. ALBRECHT
DYNAMO ELECTRIC MACHINE AND WINDING THEREFOR
Filed July 6, 1926　　　3 Sheets-Sheet 2

Sept. 25, 1928.　　　　　　　　　　　　　　　　　　　　1,685,738
G. M. ALBRECHT
DYNAMO ELECTRIC MACHINE AND WINDING THEREFOR
Filed July 6, 1926　　　　　3 Sheets-Sheet 3

Patented Sept. 25, 1928.

1,685,738

UNITED STATES PATENT OFFICE.

GEORGE M. ALBRECHT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed July 6, 1926. Serial No. 120,573.

This invention relates to dynamo-electric machines and windings therefor.

One of the objects is the provision of a dynamo-electric machine in which the number of circuits is greater than the number of poles.

Another object is the provision of machines of the hereinbefore mentioned characteristics in which the number of circuits is equal to the number of poles multiplied by an odd number, and more specifically in which said number may be, for example, 3, 5, 7, etc., or in which said number is an even number having an odd factor, as for example, 6; and more specifically machines in which the number of pairs of poles is prime to the aforesaid multiplier.

Another object is the provision of machines of the hereinbefore mentioned characteristics in which the currents in the various armature paths are equalized. Still another object is the provision of a winding in which the potential rise from one brush to another measured from bar to bar on the commutator will be a substantially smooth curve.

A further object is to accomplish the hereinbefore mentioned results without the use of external cross connectors.

Other objects will appear hereinafter as the description of the invention proceeds.

The novel features of the invention will appear from this specification and the accompanying drawings forming a part thereof and disclosing several embodiments of the invention, and all these novel features are intended to be pointed out in the claims.

Fig. 1 of the drawing is a diagrammatic view of a dynamo-electric machine embodying one form of the invention.

Figure 1:
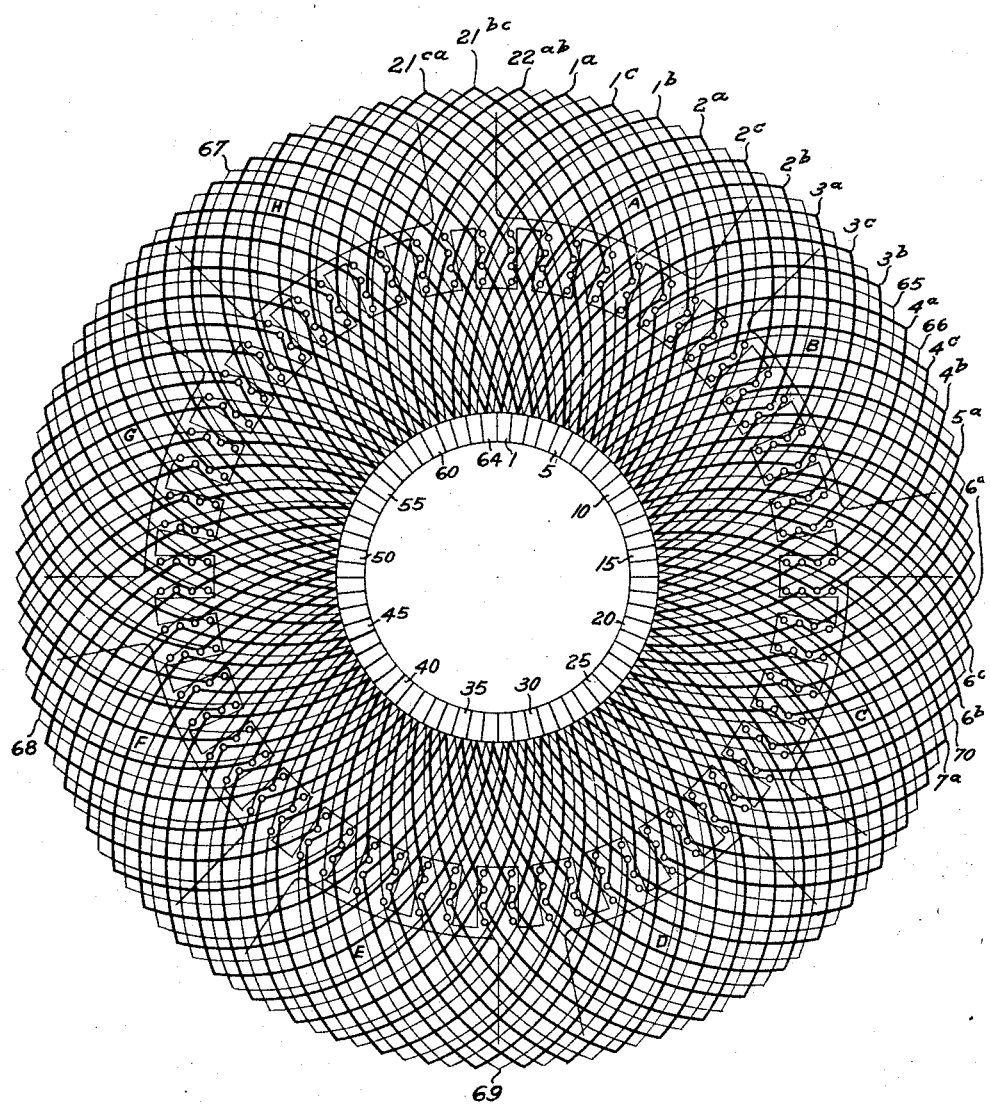

Referring to Fig. 1, the machine here shown has eight poles A, B, C, D, E, F, G, H. The armature is here shown of the slotted type there being 32 slots. Disposed in these slots is a lap type winding indicated by the heavy full lines. The lap winding is here shown as having a total of 64 coils connected to a commutator having 64 bars. There are thus 2 lap coils per slot. The lap winding is connected to form a simplex triply reentrant type winding. Under the term simplex is to be understood a winding in which if we begin tracing through the winding at a given commutator bar we must pass through all of the conductors before we again reach the bar at which tracing began. A triply reentrant simplex winding may be defined as one in which 3 rounds of the armature must be made before all of the coils are included and the bar at which tracing began is again reached. For example, if we begin tracing at bar 1 passing successively through coils $1^a$, $2^a$, $3^a$, $4^a$, $5^a$, $6^a$, $7^a$ and so on, we reach coil $21^a$ which is connected to bar 64. From bar 64 on we may trace through coil $22^{ab}$ to bar 3 and from there proceed through coils $1^b$, $2^b$, $3^b$, $4^b$ and so on until we reach coil $21^{bc}$ and bar 2. From bar 2 we may trace through coils $1^c$, $2^c$, $3^c$, $4^c$ and so on until we reach coil $21^{ca}$ which is connected to bar 1 at which tracing began. Three rounds of the armature have therefore been made. Such a winding has three times as many circuits as the number of poles, in this case therefore, 24 circuits. It may be noted at this point that a distinction is to be made between a triply or, in general, a multiply reentrant winding and a triplex or, in general, a multiplex winding. In a triplex winding the armature has 3 independent simplex windings, that is, if tracing is begun at a given bar this bar is again reached when one-third of the conductors of the winding have been traced, it being then necessary to start at another bar in order to trace another third of the conductors, and again at another bar to trace the remaining third of the conductors. Such a winding is unsuitable, for example, in a machine in which the number of poles is not divisible by 6, and in other instances for the reason that it cannot be properly equalized.

By properly selecting the various factors of the machine a winding such as shown in Fig. 1 may be equalized, and in general equalized windings may be produced having the characteristics as hereinbefore set forth. Referring more particularly to Fig. 1 it is to be noted that the number of slots and commutator bars are respectively an even number and not divisible by 3. In general, the number of slots and bars must be made respectively so as not to be divisible by the number of reentrancies of the winding. Moreover the number of slots and bars are respectively divisible by the number of pairs of poles. The number of pairs of poles must be prime to the number of reentrancies. Moreover, when the number of coils per slot is greater than 1 said number must be prime to the number of reentrancies of the winding. For example, whereas in the drawing, the number of reentrancies is 3 the number of lap coils per slot is 2, or it might be made 4, 5, 7, 8 and so on. The back conductor pitch of the coils of the winding should be odd and for manufacturing reasons is preferably made so that the slot pitch of all coils will be the same. In the particular instance shown the back conductor pitch of the lap coils is 15 and the slot pitch of these coils is 4, it being noted that there are 4 slots per pole. The front conductor pitch of the coils should be made equal to the difference between the back conductor pitch and 2 times the desired number of reentrancies of the winding, and is therefore in the present instance equal to 9. The number of circuits desired naturally determines, with a given number of poles, the number of reentrancies. That is, referring to Fig. 1, if 24 circuits are desired on an 8 pole machine the winding is made triply reentrant. The commutator pitch of the coils is equal to the number of reentrancies, that is, 3 in the illustrated example.

With the factors chosen as hereinbefore stated the winding may be effectively equalized by cross-connectors or in the manner to be hereinafter set forth. Such a lap winding as hereinbefore described in connection with Fig. 1, equalized by cross-connectors, is shown fragmentarily in Fig. 2. It is to be understood that a complete winding of the type shown in Fig. 2 will include only lap coils, that is all of the coils drawn in heavy full lines in Fig. 1. For the sake of clearness in showing the relation of the coils of the different reentrancies and the manner in which they are equalized, only certain of the coils have been illustrated in Fig. 2. It will be noted, for example, if we consider coil $1^a$ connected to bars 1 and 4, that this coil is disposed in the same position with respect to poles H and A as is coil $6^c$ connected to bars 17 and 20 with respect to poles B and C. Bars 1 and 17 are therefore equipotential bars as are also bars 4 and 20 and may therefore if desired be cross connected by cross connectors 72, 73 respectively. It will be noted moreover that the coils $1^a$ and $6^c$ are in different rounds or reentrancies of the winding. In like manner coil $1^c$ connected to bars 2 and 5 is disposed in exactly the same position relative to the field poles as is coil $6^b$ connected to bars 18 and 21. Bars 2 and 18 are therefore equipotential bars as are also bars 5 and 21 and equalization may therefore be provided between these bars as by cross-connectors 74, 75 respectively. In like manner coils $1^b$ and $7^a$ are similarly disposed with respect to the field poles and bars 3 and 19 are therefore equipotential bars as are also 6 and 22 and may be cross-connected by connectors 76, 77 respectively. Coils $11^b$, $12^a$, $12^c$, and coils $17^a$, $17^c$, $17^b$ are disposed with respect to the poles in the same position as coils $1^a$, $1^c$, $1^b$ and coils $6^c$, $6^b$, $7^a$, respectively. It will be clear, without tracing out the connections, that these sets of coils may therefore be fully cross-connected and the reentrancies interconnected as shown, and similarly to and as already described in detail in connection with the last two mentioned sets. Similarly, all of the remaining coils of the lap winding may be cross-connected. It will therefore be apparent that by reason of the equipotential points occurring in different reentrancies of the winding that all of these reentrancies may be thoroughly equalized.

Figure 2:
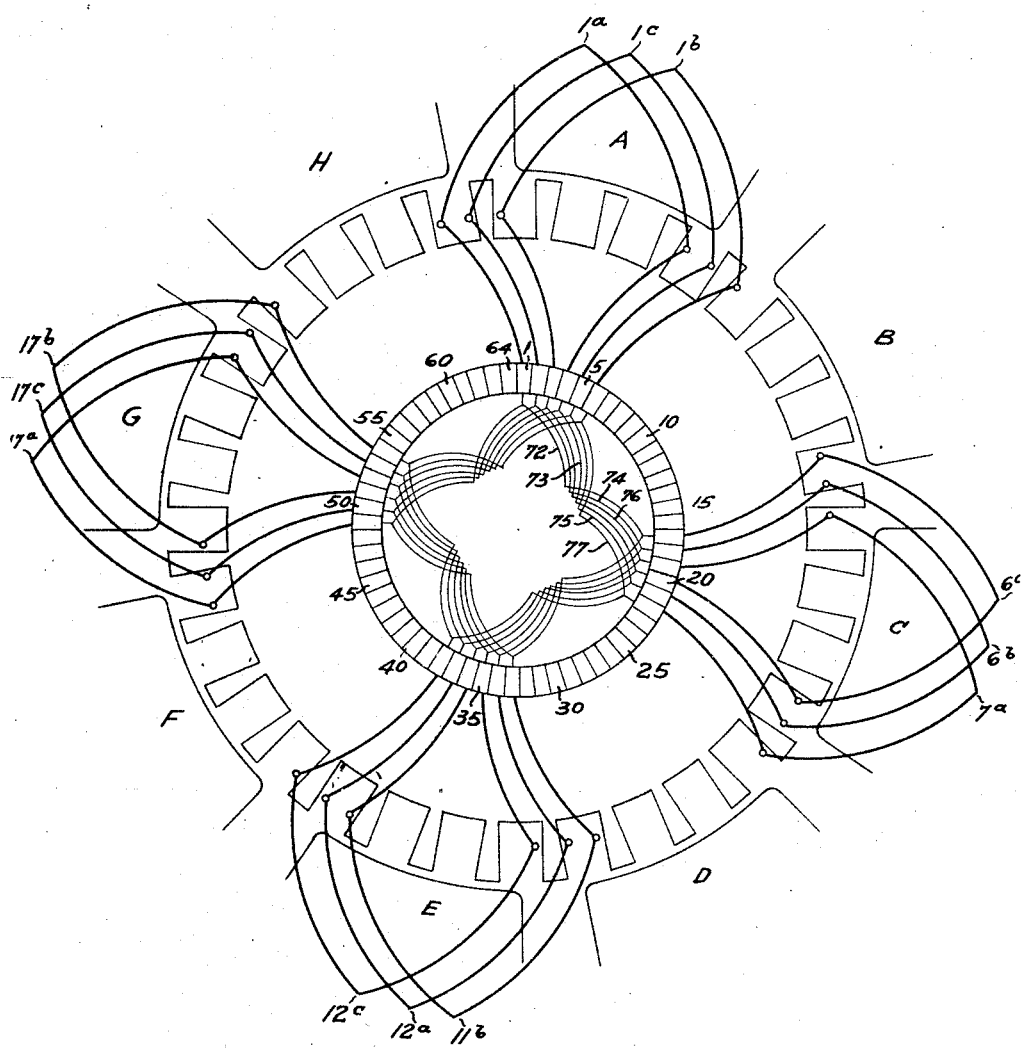
Fig. 2 is a fragmentary diagrammatic view of another form of dynamo-electric machine embodying the invention.

Instead of equalizing the lap winding hereinbefore described by means of cross-connectors, as shown in Fig. 2, it may be equalized by means of a wave type winding indicated in Fig. 1 by the light full lines. The wave winding here shown also has 64 coils disposed in the 32 slots and is connected to the 64 bars of the commutator. The wave winding here shown is of the simplex type and the factors for it are so chosen that the total number of circuits will be the same as for the lap type winding, that is, 24. The simplex wave winding may therefore be said to be 12 foldly reentrant. The average conductor pitch of the wave coils is so chosen that it is equal to the difference between the conductors allotted to the wave type winding and the number of circuits in the lap type winding, divided by the number of poles. So choosing the average pitch also predetermines the number of circuits in the wave winding as a whole whether the winding be simplex, multiplex, multiply reentrant, or any combination. The slot pitch of the wave coils is preferably made the same as for the lap coils if the number of slots per pole is an integer and the slot pitch of the lap coils is equal to the pole pitch and if not then it is made so that the slot pitch of the wave coils is equal to the difference between the slots per pair of poles and the slot pitch of the lap coils. In the case illustrated in Fig. 1 a slot pitch of both the lap and wave coils is 4. The commutator pitch of the wave coils is made equal to the difference between the commutator bars per pair of poles and the number of rounds or reentrancies of the lap type winding and is therefore 13 in the illustrated case. The average conductor pitch of the wave winding is 13, the back pitch being 15 and the front pitch 11.

The manner in which the lap winding is equalized by means of the wave winding may be seen by the following considerations. Considering for example, lap coil 1$^a$ which is connected to bars 1 and 4, there is also connected to bar 4 one terminal of a wave coil 65 the other terminal of which is connected to bar 17. The lap coil 1$^a$ and wave coil 65 generate equal and opposite electromotive forces and the wave coil 65 therefore serves as an equalizing connection through which current may flow from bar 17 to bar 1 in case these bars which are normally equipotential bars should depart from normal potential. In like manner coil 1$^c$ connected to bars 2 and 5 and wave coil 66 connected to bars 5 and 18 generate equal and opposite electromotive forces, and bars 2 and 18 are normally equipotential bars.

Figure 3:
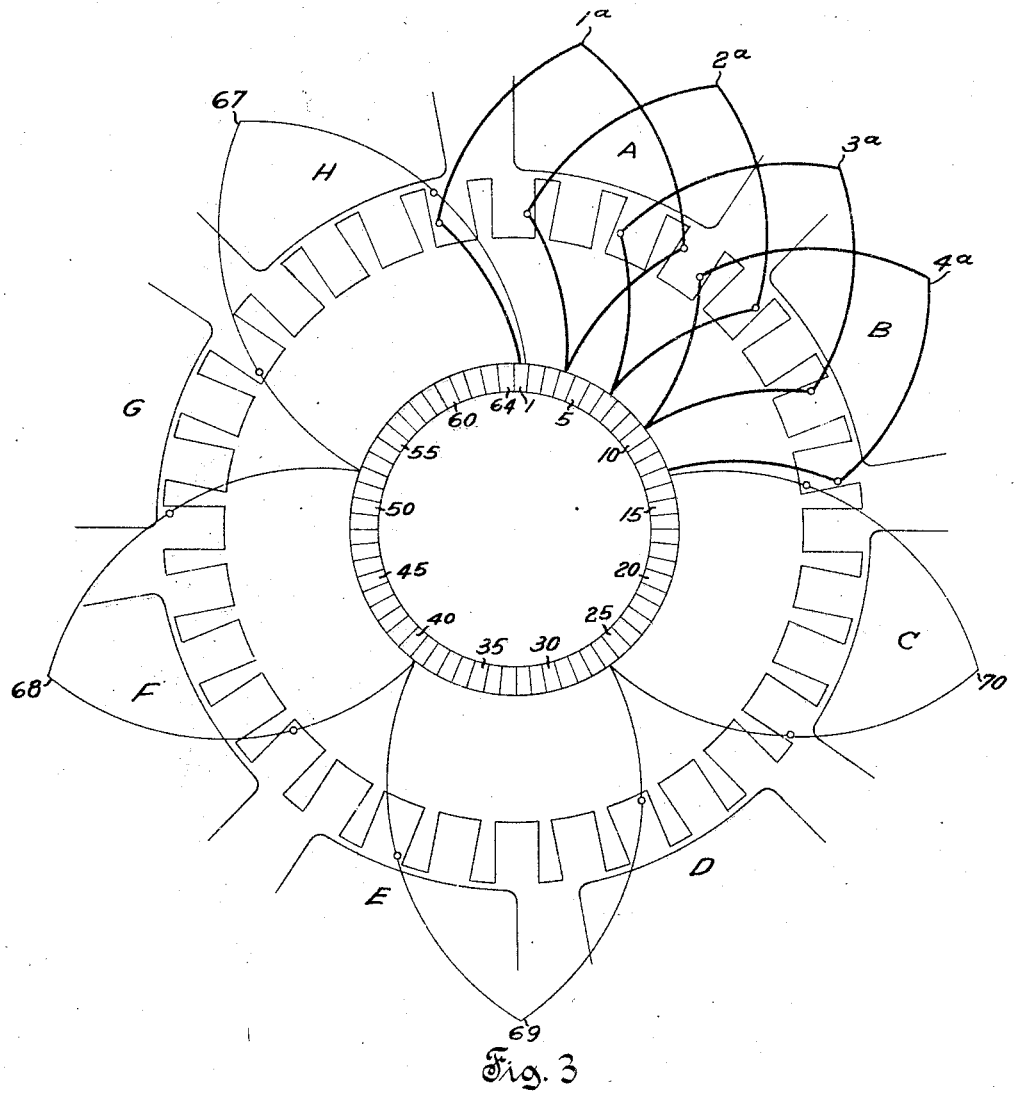
Fig. 3 is a fragmentary diagrammatic view including certain of the armature coils shown in Fig. 1.

It will moreover be observed that the lap coils are balanced group by group against the wave coils group by group. One of the sets of balanced lap and wave coil groups of Fig. 1 is shown in Fig. 3. For example, beginning at bar 1 we may trace through a wave coil 67 to bar 52, through a wave coil 68 to bar 39, through a wave coil 69 to bar 26, through a wave coil 70 to bar 13. Also beginning at bar 1 we may trace through the lap coils 1$^a$, 2$^a$, 3$^a$, 4$^a$ which latter coil is connected to bar 13. This group of lap coils is therefore balanced against the hereinbefore noted group of wave coils, the lap coil group being influenced by one pair of poles whereas the wave coil group is influenced by all of the poles.

It will be apparent from what has been hereinbefore stated that it is not essential that the wave winding be of the simplex form, for example, a 14 pole machine having 560 commutator bars and 280 slots may be provided with a triply reentrant lap winding having 2 coils per slot thus giving 42 circuits. This lap winding may be balanced by a wave winding having the same number of coils as the lap winding, the wave winding being however composed of 7 independent simplex wave windings each of which simplex winding is triply reentrant thus also producing 42 circuits.

It will also be clear that the same principles of the invention hereinbefore described may be applied in the production of quintuply reentrant lap windings or any odd number of reentrancies or a number of reentrancies having an odd factor greater than 1.

It should be understood that it is not desired to limit the invention claimed to the exact details of construction shown and described, for obvious modifications may occur to persons skilled in the art.

It is claimed and desired to secure by Letters Patent:

1. A multipolar dynamo-electric machine having an armature comprising a predetermined number of coils connected to form a simplex winding, said winding being multiply reentrant an odd number of times and having points of equal potential in different reentrances thereof, poles for said machine in number such that the number of pairs is not divisible by said number of reentrances, and a predetermined number of equalizing connections between points of equal potential.

2. A multipolar dynamo-electric machine having a number of pairs of poles prime to three, an armature for said machine and a winding therefor having a number of circuits equal to the number of poles multiplied by three times a predetermined number, and means including a predetermined number of load current-carrying conductors for equalizing the currents in said circuits.

3. A multipolar dynamo-electric machine having an armature comprising a predetermined number of coils connected to form a simplex winding, said winding being multiply reentrant an odd number of times and having points of equal potential in different reentrances thereof, poles for said machine in number such that the number of pairs is not divisible by said number of reentrances, and a predetermined number of equalizing connections including a predetermined number of load-current-carrying conductors between points of equal potential.

4. In a commutator type slotted armature for a multipolar dynamo-electric machine, said armature having an even number of slots and an even number of commutator bars, the number of slots and bars being divisible respectively by the number of pairs of poles, a simplex multiply reentrant winding disposed in said slots and connected to said commutator, said winding being reentrant a predetermined odd number of times, said machine having a number of pairs of poles not divisible by the number of said reentrances, and a predetermined number of equalizing connections for said winding.

5. In a commutator type slotted armature for a multipolar dynamo-electric machine, said armature having an even number of slots and an even number of commutator bars, the number of slots and bars being divisible respectively by the number of pairs of poles, a simplex triply reentrant winding disposed in said slots and connected to said commutator, said machine having a number of pairs of poles not divisible by three, and a predetermined number of equalizing connections for said winding.

6. A winding for a multipolar dynamo-electric machine, including a multiply reentrant lap type winding reentrant an odd number of times, and a wave type winding interconnected with said lap winding.

7. A winding for a multipolar dynamo-electric machine, including a triply reentrant lap type winding, and a wave type winding interconnected with said lap winding.

8. A winding for a multipolar dynamo-electric machine, including a multiply reentrant lap type winding reentrant an odd number of times, and a multiply reentrant wave type winding interconnected with said lap winding.

9. A winding for a multipolar dynamo-electric machine, including a triply reentrant lap type winding, and a multiply reentrant wave type winding interconnected with said lap winding.

10. In a slotted armature for a multipolar dynamo-electric machine, said armature having an even number of slots, the number of slots being divisible by the number of pairs of poles, a multiply reentrant winding disposed in said slots and having a number of circuits equal to the number of poles multiplied by an odd number, said winding having a number of coils greater than the number of slots and providing points of equal potential in different reentrancies thereof, the number of pairs of poles and the number of coils of said winding per slot being respectively prime to the number of reentrances, and means for equalizing the currents in said circuits.

11. In a slotted armature for a multipolar dynamo-electric machine, the number of armature slots being divisible by the number of pairs of poles, a multiply reentrant winding disposed in said slots and having a number of circuits equal to the number of poles multiplied by a predetermined number greater than one, said winding having a number of coils greater than the number of slots and providing points of equal potential in different reentrancies thereof, the number of pairs of poles and the number of slots being respectively prime to said predetermined number, and means for equalizing the currents of said circuits.

12. In a slotted armature for a multipolar dynamo-electric machine, the number of armature slots being divisible by the number of pairs of poles, a multiply reentrant winding disposed in said slots and having a number of circuits equal to the number of poles multiplied by a predetermined number greater than one, said winding having a number of coils greater than the number of slots and providing points of equal potential in different reentrancies thereof, the number of pairs of poles and the number of slots and the number of coils of said winding per slot being respectively prime to said predetermined number, and means for equalizing the currents of said circuits.

13. A multipolar dynamo-electric machine having an armature comprising a predetermined number of coils connected to form a simplex multiple reentrant winding, said winding having a number of circuits equal to the number of poles multiplied by three times a predetermined number and providing points of equal potential in different reentrancies thereof, poles for said machine in number such that the number of pairs is prime to three times a predetermind number, and a predetermined number of equalizing connections between points of equal potential.

14. A winding for a multipolar dynamo-electric machine, including a multiply reentrant lap type winding having a number of circuits equal to the number of poles multiplied by three times a predetermined number, and a wave type winding interconnected with said lap winding and having a number of circuits equal to said lap type winding.

In testimony whereof, the signature of the inventor is affixed hereto.

GEORGE M. ALBRECHT.